J. G. O'KELLY.
SAFETY HOOK.
APPLICATION FILED MAY 1, 1911.

1,071,650.

Patented Aug. 26, 1913.

WITNESSES:
E. Lundy
Florence R. Mitchell

INVENTOR
JOSEPH G. O'KELLY
BY
Frank D. Thomason
ATTORNEY

UNITED STATES PATENT OFFICE.

JOSEPH G. O'KELLY, OF CHICAGO, ILLINOIS.

SAFETY-HOOK.

1,071,650.   Specification of Letters Patent.   Patented Aug. 26, 1913.

Application filed May 1, 1911. Serial No. 624,404.

*To all whom it may concern:*

Be it known that I, JOSEPH G. O'KELLY, a citizen of the United States, residing at Chicago, in the county of Cook and State of Illinois, have invented new and useful Improvements in Safety-Hooks, of which the following is a full, clear, and exact description.

My invention relates to a hook and clevis such as those used in connection with hoists, derricks and similar devices that are adapted to employ a rope, chain or cable and having suitable means at the lower end to grasp the article to be lifted. In the using hooks on the ends of these cables or on the hoist blocks considerable objection is encountered owing to the hook catching under cornices and other lateral projections on the wall of the building, as well as the danger incident to the hook losing its hold on the bail attached to the article being hoisted or of said bail becoming accidentally removed by reason of a sudden jerk or swish of the end of the cable.

It is the object of my invention to construct a hook and clevis that will successfully overcome this disadvantage by providing means for protecting the end of the hook and at the same time providing a suitable locking device that prevents the escape of the hook.

It is also an object of my invention to provide means whereby the weight will not be suspended wholly or directly from the shank of the hook, but will be distributed so that a portion of the same will be sustained by the clevis in which said hook is mounted.

This I accomplish by the means and in the manner hereinafter fully described and more particularly pointed out in the claim, reference being had to the accompanying drawings forming a part of this specification, wherein:—

Figure 1:
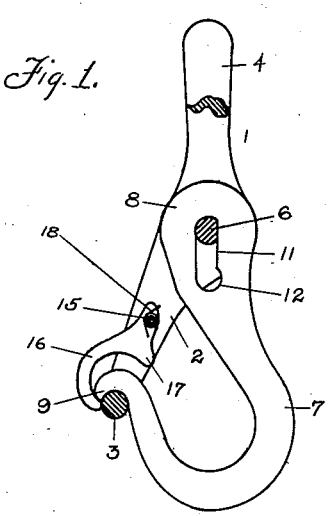
Figure 2:
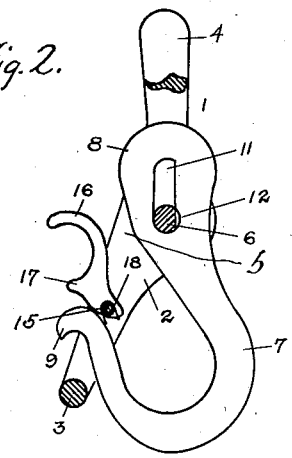
Figure 3:
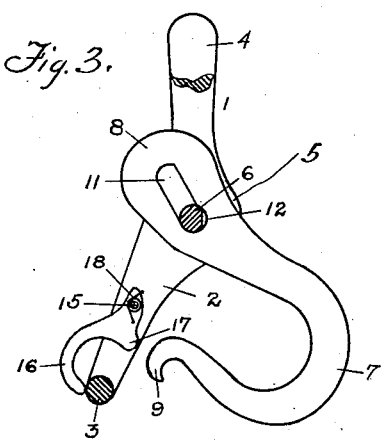
Figure 4:
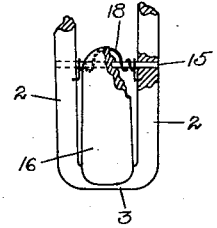
Figure 5:
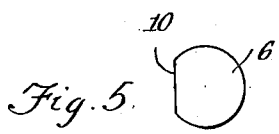

Figure 1 is a vertical side elevation of my improved hook with one member of the clevis broken away to show the hook in normal position. Fig. 2 is a similar view, showing the hook member raised from its seat. Fig. 3 is a view similar to Figs. 1 and 2 showing the hook member released and swung on its pivot. Fig. 4 is a front view of the spring used in my invention for the purpose of keeping the lock in position. Fig. 5 is an end view of the pivotal pin for the hook member, drawn to an enlarged scale.

Referring to the drawings, 1 represents a suitable clevis that preferably comprises a pair of corresponding parallel members, 2, 2, connected at their lower ends by a transverse bar or seat 3 and having their upper portions made thicker to form a suitable bail 4. I prefer to make this clevis of one integral piece of metal but, if so desired, the same may be made of several parts according to the requirements of any special work it may be called upon to perform. The central portions of these parallel members are preferably made wider than the stretches of the same and form a suitable enlarged boss 5 in which the pivotal pin 6 for the hook 7 is secured. This hook 7 is preferably made inverted crook-shape the upper portion of the shank of which is suitably enlarged to form a head 8, through which pivotal pin 6 passes, and the opposite extremity of said hook has a downturned lip 9 which, when the hook hangs in its normal position, is seated upon the transverse bar 3 of the clevis.

The pivotal pin 6 is preferably constructed in the manner shown in detail in Fig. 5 of the drawings, that is, it is substantially cylindrical in transverse section and is provided on one side with a longitudinally extending flattened portion 10. The pivotal opening 11, in the head 8 of the hook through which the pin 6 passes is preferably made as shown in detail in Figs. 1, 2 and 3 of the drawings, that is, it is elongated longitudinally to the axis of the hook shank and its lower end terminates in an enlargement or recess 12 that is circular in contour and is of substantially the same diameter as the diameter of the pivotal pin 6. The elongated portion of this slot is substantially the same width, as the shortest transverse diameter of the pin (that is the diameter through its flattened portion) so that when the hook is raised bodily the flattened portion of the pin will engage the side of the slot and prevent any rotation of the hook until the pin has reached the recess 12. At this point the lip 9 will have been elevated sufficiently from its seat on the transverse bar 3 to permit its escape therefrom and the hook can be moved as desired.

From the above it will be seen that all the weight will not be sustained by the hook itself, but it will be partially displaced so as to be sustained by the transverse bar 3 which in turn transmits it to the lower ends of the arms of the clevis. It will also be observed that the hook in its normal position, whether carrying a load or not, will be locked against the slightest rotation that would tend to unseat the lip 9 from the transverse bar 3 and it is necessary to raise the same to the full limit of its movement and compress the spring 13 before the same can be unlocked. The arms 2 of the bracket act as a shield or guard and prevent the hook catching under projections or becoming entangled in the cables.

Mounted on a suitable journaling pin 15 tapped through parallel bifurcations or arms 2 of the clevis 1, is a suitable sickle-shaped pawl or latch 16 that is fulcrumed by said pin passing through its shank. This pawl is also provided with an embossment or lug 17 that forms a continuation of the angle of meeting of the shank and segmental member of this pawl. The whole latch is kept normally pressed downward by means of a coiled spring 18 surrounding the pin 15 and having an intermediate portion engaging said pawl while its ends are secured to said parallel members. The arrangement and location of this pawl is such that the outer end of its segmental member contacts with the transverse bar or seat 3 just below the lip 9 of the hook 7 and then curves around over the same as seen in Fig. 1 of the drawings so that if the hook should be accidentally raised from the seat its upper surface will contact therewith and the lug 17 will prevent its rotation or the further raising of said hook.

When it is desired to operate the hook, the latch is simply raised into the position, shown in Fig. 2, and the hook can then be raised from its seat a distance sufficient to permit the pin 6 to become seated in the circular recess or enlargement 12 and operated in the manner hereinbefore described.

From the above, it will be seen that the hook is successfully locked on its seat on the transverse bar 3 and it is impossible to operate the same without first raising the latch.

When placing the hook on its seat it is not necessary for the operator to raise the latch, but simply to push upon the hook which will automatically force the latch upward and away from the bar 3 to approximately the position shown in Fig. 2 when the same can be seated and the latch will automatically return to its proper position.

What I claim as new is:—

A suspension device of the kind specified comprising an integral clevis consisting of an endless link of rectangular outline, a hook mounted between the parallel longitudinal members of said clevis the open end of which is normally closed by said clevis, a slot in the upper end of said hook that has an enlarged recess, a pin passing through said slot and seated in the parallel members of said clevis, said pin being substantially cylindrical-shaped its diameter corresponding to the width of the enlarged recess in said hook and having a flattened portion that permits said pin to enter and move in said slot in which latter position said hook is locked against rotation on said pin and has its outer free end passing through said clevis and seated upon a portion thereof and supported thereby, and a pivoted latch carried by said clevis between said pin and the outer end of said hook, which latch normally prevents the movement of said hook.

In witness whereof I have hereunto set my hand this 17th day of April 1911.

JOSEPH G. O'KELLY.

Witnesses:
E. K. LUNDY,
FRANK D. THOMASON.